United States Patent [19]

Sato

[11] 4,267,604
[45] May 12, 1981

[54] UHF ELECTRONIC TUNER

[75] Inventor: Akira Sato, Hiratsuka, Japan

[73] Assignee: Sony Corporation, Tokyo, Japan

[21] Appl. No.: 5,020

[22] Filed: Jan. 19, 1979

[30] Foreign Application Priority Data

Feb. 1, 1978 [JP] Japan .................................. 53-10175

[51] Int. Cl.³ .............................................. H04B 1/18
[52] U.S. Cl. ...................................... 455/193; 334/41;
455/281; 455/290; 455/292
[58] Field of Search ............... 325/373, 376, 379, 381,
325/383, 385, 386, 459; 455/150, 191, 193, 198,
311, 339, 269, 280, 281, 282, 286, 290, 292;
334/41, 42, 45

[56] References Cited

U.S. PATENT DOCUMENTS

| 2,201,199 | 5/1940 | Peterson | 455/281 |
|---|---|---|---|
| 2,476,803 | 7/1949 | Booth | 455/281 |
| 3,020,401 | 2/1962 | Isabeau | 325/383 |
| 3,727,140 | 4/1973 | Nieto et al. | 325/459 |
| 3,792,359 | 2/1974 | Carlson | 325/381 |
| 4,145,659 | 3/1979 | Wolfram | 334/45 |

Primary Examiner—Marc E. Bookbinder
Attorney, Agent, or Firm—Lewis H. Eslinger; Alvin Sinderbrand

[57] ABSTRACT

An RF input tuning circuit in a UHF electronic tuner uses a semicoaxial resonant cavity circuit which feeds amplifier and other tuning circuits not of the semicoaxial type, such as lumped constant or strip-line types.

2 Claims, 2 Drawing Figures

UHF ELECTRONIC TUNER

BACKGROUND OF THE INVENTION

1. Field of the Invention

This invention relates to a UHF (Ultra High Frequency) electronic tuner suitable for use in a television receiver, and more particularly to a UHF electronic tuner in which a lumped constant tuning circuit is used together with a distributed constant tuning circuit so as to take advantage of the merits of both types of circuits and to avoid their disadvantages.

2. Description of the Prior Art

Generally, a UHF electronic tuner includes an RF (Radio Frequency) input circuit, an RF amplifying circuit, a mixing circuit and a local osillating circuit which are coupled to each other through respective tuning circuits. Circuits for UHF electronic tuners are roughly classified into lumped constant tuning circuit types utilizing lumped constant elements such as capacitors, inductors and resistors and distributed constant tuning circuit types utilizing distributed constant elements such as resonant cavities.

Lumped constant circuit elements are normally mounted on printed-circuit boards and thus are easily mass produced using conventional automatic equipment. However, when used in UHF tuning circuits, lumped constant tuning circuits have so much loss, particularly when used in an RF input circuit, that deterioration in the noise figure (NF) may occur. Moreover, lumped constant circuits have the additional disadvantage that they do not offer an easy way to convert the normal balanced antenna input impedance of between about 200 and 300 ohms to the required unbalanced input impedance of about 75 ohms.

Distributed constant circuits are divided into a first type characterized by strip-line circuits and a second type characterized by semicoaxial resonant cavity circuits consisting of an outer conductor which forms a cavity and an inner conductor placed within that cavity. Strip-line circuits, which include one type which can be formed on a printed-circuit board, are more easily mass produced but they have the disadvantage that they also do not offer an easy way to convert a balanced antenna input impedance of between 200 and 300 ohms to the required unbalanced input impedance of about 75 ohms. In a distributed constant device of the semicoaxial resonant cavity type, a metal case is partitioned into a plurality of compartments by partitioning plates. The necessary circuits are placed in the respective compartments, and are coupled to each other using tuning circuits employing an inner conductor and a cavity. This type is widely used, and has the desirable characteristics of low loss and ease of accommodating either unbalanced or balanced antenna inputs. However, semicoaxial devices have the disadvantage that they are more difficult and costly to mass produce since the inner conductor must be accurately spatially arranged with respect to an input coupling device and to the cavity, and they are thus less adapted to mass production and are more costly.

In lumped constant or strip-line circuits, a $\lambda/2$-balun utilizing a strip line element is often used as an impedance converter from 300 ohms balanced to 75 ohms unbalanced in order to match the antenna impedance to the required input impedance. Such a balum does not maintain a good impedance match over the wide frequency range of the UHF band. Interference from HF (High Frequency) or VHF (Very High Frequency) signals can therefore be picked up by feeder extending from an antenna to the receiver and interfere with the desired UHF signal. Accordingly, a high-pass filter is also normally required in the input circuit to reject such interference.

SUMMARY OF THE INVENTION

Accordingly, it is an object of this invention to provide a UHF electronic tuner which combines lumped constant type tuning circuit with a distributed constant type input tuning circuit, and which thereby overcomes the above described defects of the prior art.

Another object of this invention is to provide a UHF electronic tuner in which a distributed constant type tuning circuit utilizing a semicoaxial device is used only in the radio frequency input circuit and in which only lumped constant or strip-line tuning circuits are used elsewhere in the UHF tuner. In accordance with an aspect of this invention, a UHF electronic tuner comprises an antenna coil for receiving radio frequency input signals, a first tuning circuit for tuning radio frequency input a desired signal in the radio frequency input signals, the first tuning circuit being a distributed constant circuit utilizing a semicoaxial resonant cavity device having an inner conductor which is electrically coupled to the antenna coil, a radio frequency amplifier coupled to the first tuning circuit, a mixer, a second tuning circuit between an output of the radio frequency amplifier and an input of the mixer, and a local oscillator having a third tuning circuit, an output of said local oscillator being coupled with the mixer, both of the second and third tuning circuits being of a circuit type different from a semicoaxial resonant device.

An RF input tuning circuit utilizing a semicoaxial resonant device has the advantages of low loss and easy matching of input impedance, as above described. According to this invention, special attention is paid to the fact that both of the above advantages relate only to the RF input circuit, and so a semicoaxial resonant device is used only in a RF input circuit. An antenna coil is electrically coupled to the semicoaxial resonant device. The remainder of the UHF tuner, including other tuning circuits for an RF amplifier, a mixer and a local oscillator employ lumped constant circuits or strip-line circuits. With such an arrangement, the disadvantages of loss and difficulty of impedance conversion in the RF input circuit using lumped constant circuits are avoided. Moreover, according to this invention, all of the tuning circuits including the semicoaxial RF input circuit and the lumped constant or strip-line tuning circuits which follow it may be mounted on the same printed-circuit board and enclosed in the same case, and so a UHF electronic tuner according to this invention is easily mass produced. Moreover, the balun and high-pass filter which are required in lumped constant or strip-line circuits of the prior art can be omitted. According to this invention therefore, the disadvantages of both lumped constant circuits and distributed constant circuits are avoided, and only their advantages are realized.

Various other objects, advantages and features of the present invention will become readily apparent from the ensuring detailed description, and the novel features will be particularly pointed out in the appended claims.

DESCRIPTION OF THE PREFERRED EMBODIMENTS

Figure 1:
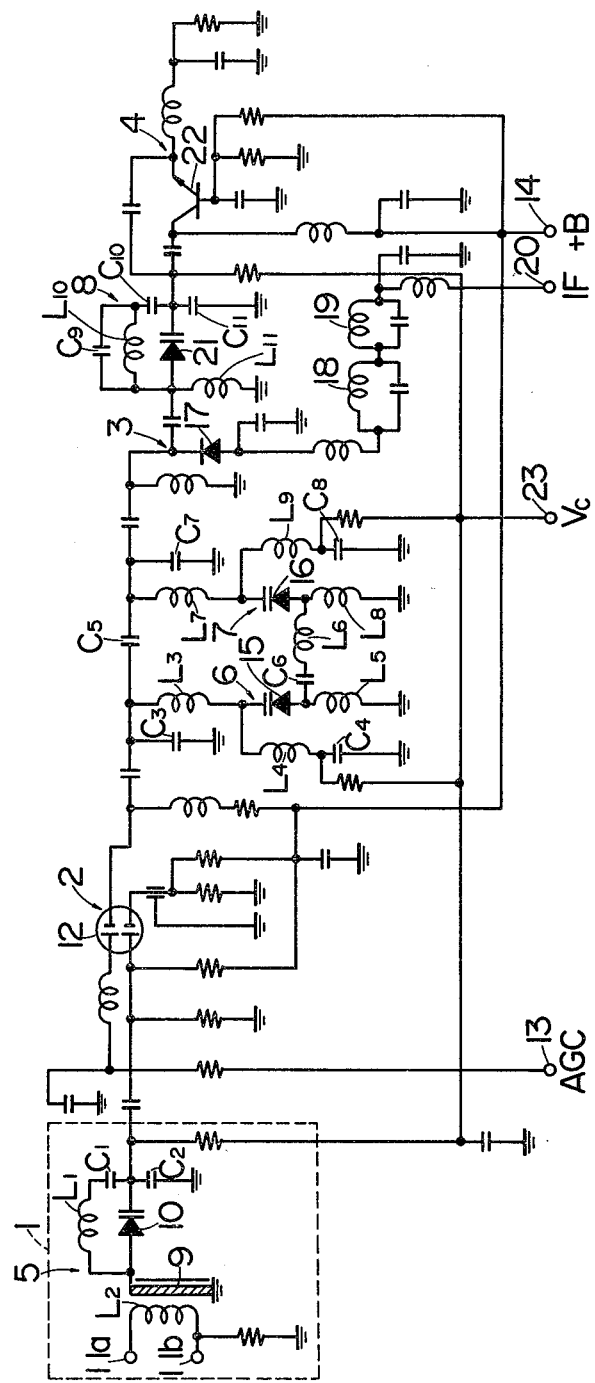
FIG. 1 is a schematic diagram showing a UHF electronic tuner according to an embodiment of the present invention.

Referring to FIG. 1, a UHF tuner according to an embodiment of this invention includes an RF input circuit 1, an RF amplifying circuit or RF amplifier 2, a mixing or heterodyning circuit mixer 3 and a local oscillating circuit or local osillator 4. A tuning circuit 5 in RF input circuit 1 comprises a distributed constant semicoaxial resonant device. Tuning circuits 6, 7 and 8 in the other circuits comprise lumped constant type circuits. Tuning circuits 6, 7 and 8, RF amplifying circuit 2, mixing circuit 3 and local oscillating circuit 4 are preferably mounted on the same printed-circuit board with portions of the semicoaxial RF input circuit. The semicoaxial input tuning circuit 5 is made up of an inner conductor 9, a coil $L_1$, a varactor 10, and capacitors $C_1$ and $C_2$. Inner conductor 9 is electrically coupled to an antenna coil $L_2$ connected to antenna input terminals 11a and 11b.

Figure 2:
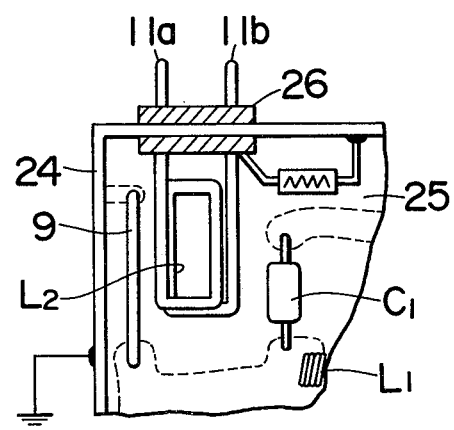
FIG. 2 is a pictorial diagram showing an RF input tuning portion according to the embodiment of the UHF electronic tuner in FIG. 1.

FIG. 2 shows one example of an arrangement of the semicoaxial resonant cavity input tuning circuits and antenna coil $L_2$. A tuner case 24 made of conductive material is connected to ground. A printed-circuit board 25 is fitted in tuner case 24. The semicoaxial resonant cavity device is made up of an inner conductor 9 mounted on the printed-circuit board 25 with the tuner case 24 serving as an outer conductor. A space between inner conductor 9 and part of the tuner case 24 functions as a resonant cavity. Antenna coil $L_2$ is disposed adjacent to inner conductor 9, and is held in place by an insulating member 26 in tuner case 24. RF input terminals 11a and 11b project outward from tuner case 24 for external connection of antenna feed lines thereto. RF coupling between antenna coil $L_2$ and inner conductor 9 is accomplished by the physical proximity of these elements. Referring again to FIG. 1, RF amplifying circuit 2 includes a four-pole MOS FET 12. An RF input signal from input circuit 1 along with a bias voltage from a power source terminal 14 to which a power source voltage +B is applied are applied to a first gate of MOS FET 12. An AGC voltage is applied to a second gate of MOS FET 12 from an input terminal 13. Drain voltages are applied to drain electrodes of MOS FET 12 from power source terminal 14. Tuning circuits 6 and 7 include varactors 15 and 16, capacitors $C_3$ to $C_8$ and coils $L_3$ to $L_9$. Mixing circuit 3 includes a mixing diode 17. An IF output signal from mixing circuit 3 is fed through adjacent-channel traps 18 and 19 to an output terminal 20. The tuning circuit 8 includes a varactor 21, capacitors $C_9$ to $C_{11}$, and coils $L_{10}$ and $L_{11}$. Local oscillating circuit 4 includes a transistor 22. The power source voltage +B at terminal 14 is supplied to a collector electrode of transistor 22, and further is supplied through a base bias circuit to a base electrode of transistor 22. A control voltage $V_c$ in accordance with a selected channel is supplied to varactors 10, 15, 16 and 21 from an input terminal 23 to vary the capacitances of varactors 10, 15, 16 and 21. The tuning frequencies of tuning circuits 5 to 8 are varied in accordance with the capacitances of varactors 10, 15, 16 and 21, and thus control the frequency to which the UHF tuner is tuned.

In the above described circuit, a received signal from an antenna is fed through input terminals 11a and 11b to antenna coil $L_2$. A signal corresponding to the received signal is induced in inner conductor 9, and tuned in the resonant cavity of tuning circuit 5 formed between inner conductor 9 and tuner case 24. The tuned RF signal is amplified in RF amplifier 2 an amount depending on the AGC voltage applied to MOS FET 12. The amplified RF signal is supplied through tuning circuits 6 and 7 to mixing circuit 3. The oscillating output of local oscillating circuit 4 is supplied through tuning circuit 8 to mixing circuit 3. The oscillating output from tuning circuit 8 to be mixed or heterodyned in mixing circuit 3 has a frequency which depends on the magnitude of control voltage Vc, and is mixed with the RF signal in mixing diode 17 of mixing circuit 3. The output of mixing circuit 3 is an IF signal which is fed through trap circuits 18 and 19 to output terminal 20. In this embodiment, the tuning circuits 6 to 8 are of the lumped constant type. However, they may alternatively be of the strip-line type without departing from the scope of the invention. A conventional electronic tuner of the lumped constant type or of the strip-line type requires a shielded case. According to this embodiment, case 24, as shown in FIG. 2, not only encloses inner conductor 9 and serves therewith as the outer conductor of a semicoaxial cavity, but also tuner case 24 encloses all of input circuit 1, RF circuit 2, mixing circuit 3, local oscillating circuit 4 and tuning circuits 5 to 8 which are mounted on printed-circuit board 25 with inner conductor 9.

According to this invention, the tuning circuit of the RF input circuit is of the distributed constant semicoaxial type having its inner conductor mounted on a circuit board 25, and all other tuning circuits are of the lumped constant or strip-line types also mounted on the same circuit board 25 and enclosed in the same case 24. A semicoaxial input circuit exhibits low loss, permits easy matching of the input impedance and is simple in construction. When such semicoaxial input circuit is combined with lumped constant or strip-line devices, the combination is superior in its adaptability to mass production. Also, the ease of matching the input impedance permits the omission of a high-pass filter and a strip-line balun.

Although an illustrative embodiment of the invention has been described in detail herein with reference to the accompanying drawings, it is to be understood that the invention is not limited to that precise embodiment, and that various changes and modifications can be effected therein by one skilled in the art without departing from the scope and spirit of the invention as defined in the appended claims.

What we claim is:

1. An ultra high frequency electronic tuner for tuning and heterodyning a desired radio frequency signal from among a possible plurality of radio frequency signals received from an antenna, said tuner comprising: a circuit board, a conductive tuner case surrounding said circuit board, a slender metallic bar mounted on said circuit board and forming a resonant cavity between itself and a wall of said tuner case, said resonant cavity being a resonant cavity radio frequency input circuit, an antenna coil for receiving radio frequency input signals, said antenna coil being disposed in said tuner case and being electromagnetically coupled to said slender metallic bar, at least one other resonant circuit disposed on said circuit board for tuning an output of said resonant cavity and being of a type other than a resonant cavity circuit.

2. An ultra high frequency electronic tuner for tuning and heterodyning a desired radio frequency signal from among a possible plurality of radio frequency signals received from an antenna, said tuner comprising: a circuit board, a conductive tuner case surrounding said circuit board, a slender metallic bar mounted on said circuit board and electromagnetically coupled to said antenna, said metallic bar forming a resonant cavity between itself and a wall of said tuner case, said resonant cavity being a resonant cavity radio frequency input circuit, and at least one other resonant circuit disposed on said circuit board for tuning an output of said resonant cavity and being of a type other than a resonant cavity circuit.

* * * * *